J. A. ARMENTROUT.
SHEEP COLLARS.

No. 180,518. Patented Aug. 1, 1876.

Attest:
John W. Alby
Sandy Wilson

Inventor:
James A. Armentrout

UNITED STATES PATENT OFFICE.

JAMES A. ARMENTROUT, OF STAUNTON, VIRGINIA, ASSIGNOR TO MARTHA E. ARMENTROUT, OF SAME PLACE.

IMPROVEMENT IN SHEEP-COLLARS.

Specification forming part of Letters Patent No. 180,518, dated August 1, 1876; application filed February 7, 1876.

*To all whom it may concern:*

Be it known that I, JAMES A. ARMENTROUT, of Staunton, in the county of Augusta and State of Virginia, have invented a new and Improved Sheep-Collar; and I do hereby declare that the following is a full, clear, and exact description of the same.

The object of the invention is a collar armed with spikes or teeth for the purpose of preventing sheep being killed by dogs. As is well known, when a sheep is attacked by a dog, the neck is usually seized, and the large veins being thus torn open, the animal quickly bleeds to death. The collar prevents the dog seizing the neck of a sheep, or at least retaining his hold on it, by reason of the sharp spikes entering his jaws and thus causing intense pain.

Figure 1:
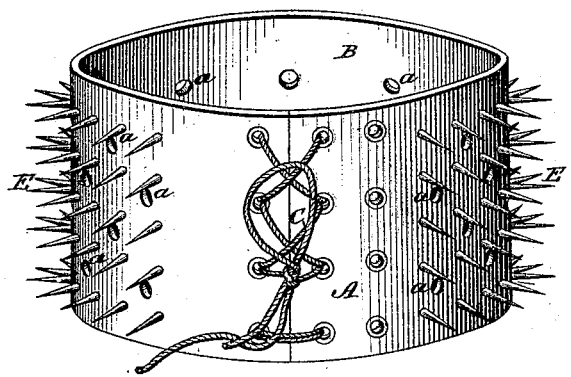
Figure 2:
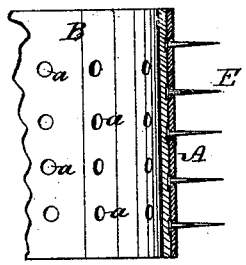

Figure 1 is a perspective view of the collar complete, and Fig. 2 a section of a fragment thereof.

The body of the collar is composed of an outer plate or strap, A, of leather, and an inner strap, B, the ends of the same being connected by a cord or lace, C. The collar is thickly studded with sharp nails or teeth E, which are inserted through the outer plate A, only the heads being confined between the two straps A B, so that they are prevented working in toward the neck of the sheep, and the points projecting outward, and standing in such close proximity as to pierce the jaws of the dog, and prevent his teeth closing on the neck of the sheep. The collar is pierced with a number of holes, $a$, which afford due ventilation to the neck of the sheep.

What I claim is—

The improved ventilating sheep-collar, composed of an outer plate or band of leather, provided with projecting spikes or teeth, and an inner band for protecting the neck of the animal, all substantially as shown and described.

JAMES A. ARMENTROUT.

Witnesses:
 JOHN W. ALLY,
 SANDY WILSON.